United States Patent [19]

Egli et al.

[11] 4,285,691
[45] Aug. 25, 1981

[54] ALKOXYLATED FATTY AMINES AND POLYAMINES AS RESERVING AGENTS

[75] Inventors: Hermann Egli, Basel; Emil Engeler, Binningen, both of Switzerland

[73] Assignee: Sandoz Ltd., Basel, Switzerland

[21] Appl. No.: 117,254

[22] Filed: Jan. 31, 1980

[30] Foreign Application Priority Data

Feb. 6, 1979 [CH] Switzerland ............ 1149/79

[51] Int. Cl.$^3$ ............ D06P 5/00; D06P 3/87; D06P 5/12; D06P 5/13
[52] U.S. Cl. ............ 8/455; 8/478; 8/602; 8/446; 8/641
[58] Field of Search ............ 8/463, 457, 455, 478

[56] References Cited

U.S. PATENT DOCUMENTS

| | | | |
|---|---|---|---|
| 2,963,513 | 12/1960 | Albrecht | 8/604 |
| 2,967,755 | 1/1961 | Keller | 8/602 |
| 3,074,774 | 1/1963 | Sapers et al. | 8/457 |
| 3,591,325 | 7/1971 | Sapers | 8/457 |
| 3,627,475 | 12/1971 | Baumann | 8/558 |

FOREIGN PATENT DOCUMENTS 1006787 10/1965 United Kingdom .
1489456 10/1977 United Kingdom .

OTHER PUBLICATIONS

Atherton, E., Jour. of the Soc. of Dyers & Colourists, vol. 74, No. 4, p. 242 (1958).

*Primary Examiner*—Joseph L. Schofer
*Assistant Examiner*—Maria Parrish Tungol
*Attorney, Agent, or Firm*—Gerald D. Sharkin; Richard E. Vila; Thomas C. Doyle

[57] ABSTRACT

The present invention provides a process for dyeing an anionic dyeable substrate with reserve and/or multicolored effects, which process comprises (1) impregnating the substrate with a dyeing liquor containing an anionic dye having a K'-value$\geq 5$ (2) directly thereafter applying locally to the substrate a liquor or paste containing an alkoxylated fatty amine or polyamine having affinity for anionic dyes with a K'value$\geq 5$ and optionally a disperse dye and/or an anionic dye or an anionic optical brightening agent with the proviso that the anionic dye or optical brightening agent has a K-value at least one unit lower than the K'value of the anionic dye used in step (1), and (3) subsequently submitting the substrate to a heat treatment to effect fixation of the dye(s) and, if used, optical brightening agent.

18 Claims, No Drawings

ALKOXYLATED FATTY AMINES AND POLYAMINES AS RESERVING AGENTS

The present invention relates to a process for dyeing a substrate dyeable with anionic dyes to produce reserve and/or multicoloured effects.

It is known to obtain tone-in-tone reserve or multicoloured effects either by applying to a substrate in a two-stage process a reserving agent containing a fibre-reactive group followed by fixation and subsequently dyeing the substrate with anionic, cationic or disperse dyes, or by a wet-on-wet process in the absence or in the presence of a reserving agent, such agent having affinity for fibres or containing a fibre-reactive group. The former process requires an intermediary fixation step whereas in the latter a substantial amount of reserving agent containing a fibre-reactive group is necessary to obtain full or almost full reservation. When a reserving agent having affinity for fibres is used, the reservation and bicoloured effects thereby obtained are unsatisfactory. Furthermore, in such processes, the number of dyestuffs employable to obtain total or almost total reserve effects is limited. In the case where the deposited dyestuff is displaced in the absence of a reserving agent, e.g. by mechanical means, the reproducibility of the reservation is unsatisfactory.

It has now been found that total reserve effects and bi- or multi-coloured effects of pure shade may be achieved in a wet-on-wet dyeing process by the use of an alkoxylated fatty amine or polyamine as reserving agent.

Accordingly, the present invention provides a process for dyeing an anionic dyeable substrate with reserve and/or multicoloured effects, which process comprises (1) impregnating the substrate with a dyeing liquor containing an anionic dye having a K'-value $\geq 5$ (2) directly thereafter applying locally to the substrate a liquor or paste containing an alkoxylated fatty amine or polyamine having affinity for anionic dyes with a K'-value $\geq 5$ and optionally a disperse dye and/or an anionic dye or an anionic optical brightening agent with the proviso that the anionic dye or optical brightening agent has a K-value at least one unit lower than the K'-value of the anionic dye used in step (1), and (3) subsequently submitting the substrate to a heat treatment to effect fixation of the dye(s) and, if used, the optical brightening agent.

The "K-value" (or K'-value) (combinability-value) used herein is an experimentally established value; this value is usually employed to indicate the combination capacity of anionic dyes [See GB Pat. No. 1,489,456; Otten H. G., Bayer Farbenrevue, 21, 32 (1972); and Beckmann W., Hoffmann F. and Otten H. G., Melliand Textilber. 6, 641 (1973)]. The K-value is a specific dyestuff characteristic which provides a practical indication of the behaviour in dyeing of an anionic dye in relation with its combination capacity.

The K-value of the anionic dyes used according to the process of the invention has been determined according to the following test method with reference to a standard dye whose K-value (or K'-value) is known:

Nylon yarn (Du Pont, type 846) is introduced in a dyebath at 40° containing a standard dye and the dye to be tested in an amount corresponding for each dye respectively to the amount sufficient to obtain a standard dyeing ⅛ S.I. (Standard Intensity), 2 g/l sodium dihydrogen phosphate and 0,3 g/l disodium hydrogen phosphate in demineralized water (pH of the dyeing liquor=6). The goods to liquor ratio is 1:40. The dyebath is then heated from 40° to 100° C. at a rate of 1° C./min. The dye concentration of the dyebath is determined spectrophotometrically every 5 min (or 2,5 min when the dye builds up quickly) and calculated with a computer. The K-value of the dye to be tested is then calculated according to the method indicated by Atherton E., Downey D. A. and Peters R. H. in J.S.D.C., 74, 242 (1958).

As the K-value of an anionic dye is influenced by the presence of a cationic compound, the test is carried out under the same conditions as disclosed above, in the presence of 2% by weight of a commercially available cationic levelling agent based on an ethoxylated aminopropyl-fattyamine. The resulting value is referred to as K'-value.

Step (1) is a ground dyeing of the substrate on the whole area. It may be carried out according to known methods, e.g. padding, pouring, slop-padding, etc., at room temperature. Suitable anionic dyestuffs for the ground dyeing are those having a K'-value $\geq 5$, preferably $\geq 6$. Preferred anionic dyes are acid dyes containing two or more sulpho groups and metal complex dyes containing at least one sulpho group. Most preferred anionic dyes are 1:2 or 1:1 chromium or cobalt complexes, particularly of azo or azomethine dyestuff, containing one or two sulpho groups. Such dyestuffs are known from the Colour Index.

In addition to the anionic dyestuff, the liquor used in step (1) may contain conventional additives such as a thickening agent, a dispersing agent, etc. The dyeing liquor is conveniently adjusted to an acid pH, e.g. 4 to 7, preferably 5 to 6. The pick-up of the dyeing liquor of step (1) is generally in the range of 60 to 200%, preferably 80 to 120% based on the weight of the dry substrate.

Directly after step (1), i.e. without any intermediary rinsing or drying step, the substrate is locally treated, in controlled form or at random, with a liquor or a paste containing an alkoxylated fatty amine or polyamine having affinity for anionic dyes with a K'-value $\geq 5$. The affinity of the amine for anionic dyes with a K'-value $\geq 5$ may be determined e.g. by the following test method:

Two dyestuff solutions are prepared (a) 0.2 ml of an aqueous solution of an anionic dyestuff (1 part dyestuff:100 parts water), having a K'-value $\geq 5$ are added to 5 ml of demineralized water.

(b) A solution is prepared according to (a) and then 0.5 ml of an aqueous solution of the alkoxylated fatty amine or polyamine to be tested (0.4 parts amine:100 parts water) are added to the solution.

A drop of each solution (a) and (b) is deposited on a thin layer chromatography plate. After drying at room temperature, the spot of the solution (a) is coloured on the whole diffusion surface whereas the spot of the solution (b) containing the amine having affinity for anionic dyes with a K'-value $\geq 5$ is coloured in the center and comprises an almost colourless and relatively wide edge.

The amine used in step (2) is a retarding/levelling agent having dispersing properties and which is able to give reserving effects on the dyed substrate. Preferably the amine has a cationic or amphoteric character, more preferably cationic. In the following discussion, the alkoxylated fatty amines or polyamines are referred to as reserving agents; these compounds are free of fibre-reactive groups.

Preferred cationic reserving agents according to the invention are those of formula I

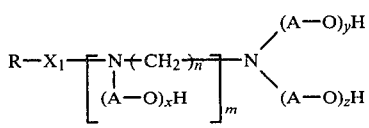

wherein
R is $(C_{10\text{-}24})$ alkyl or $(C_{10\text{-}24})$ alkenyl
$X_1$ is —CO— or a direct bond in each $(A-O)_x$, $(A-O)_y$ and $(A-O)_z$ chain A is, independently, —CH$_2$CH$_2$— or

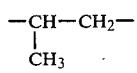

each n is, independently, 2 or 3 m is 0 or an integer from 1 to 6, and each x, y or z is a numeral from 1 to 100 the sum $x+y+z$ being from 10 to 100, in free base, acid addition salt and/or quaternary ammonium salt form and mixtures of such compounds differing from one another by virtue of the significance of R.

R is preferably $(C_{12\text{-}24})$alkyl or $(C_{12\text{-}24})$ alkenyl. R may be for example dodecyl, hexadecyl, octadecyl, octadecadienyl, arachinyl, behenyl, the mixture of alkyl groups present in soya fatty acid or tallow fatty acid, etc.

n is preferably 2 when m exceeds 1, and preferably 3 when m is 1.

m is preferably 1, 2 or 3, more preferably 1.

Preferably the sum $x+y+z$ corresponding to the total number of ethylene-oxy and/or propylene-oxy units is from 15 to 80, more preferably from 30 to 40. The $(AO)_{x,y,z}$ chains are preferably made up of ethylene-oxy units or ethylene-oxy and propylene-oxy blocks, more preferably of ethylene-oxy units.

The alkoxylated amine or polyamine, particularly the compounds of formula I, may be used in acid addition salt and/or quaternary ammonium salt form. Preferred acid addition salt forms are those derived from hydrogen haloacids, for example from hydrochloric acid. Preferred quaternary ammonium salt forms are those bearing on the quaternized nitrogen atom a$(C_{1\text{-}4})$alkyl or aryl-$(C_{1\text{-}4})$alkyl group, especially methyl or benzyl. Suitable anions of the quaternary ammonium salts are e.g. halogenide, preferably chloride, or sulfate ions.

A preferred class of amines of formula I is the one constituted by compounds of formula Ia

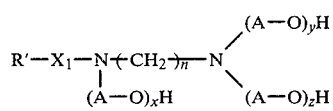

wherein A, $X_1$, x, y, z and n are as defined above, and R' is $(C_{12\text{-}24})$alkyl or $(C_{12\text{-}24})$alkenyl in free base, acid addition salt and/or quaternary ammonium salt form.

The compounds of formula I are either known or may be prepared in known manner e.g. as disclosed in U.S. Pat. Nos. 3,627,475 and 2,967,755 and in GB Pat. No. 1,006,787.

The local application of the reserving agent in step (2) may be effected by known methods, for example by printing, e.g. flat or rotary screen printing, jet printing, space-dyeing or dropping e.g. by the TAK process.

The amount of reserving agent in the paste or liquor may vary within wide limits depending on the desired effect and on the dyestuff used. In general, satisfactory results are obtained when the liquor or paste contains 1 to 15 g/liter, preferably 1 to 12, more preferably 4 to 8 g/liter of reserving agent.

When bi- or multi-coloured patterns are desired, a paste or liquor containing a disperse dye and/or an anionic dye or an anionic optical brightening agent in addition to the reserving agent may be applied locally on the substrate, provided that the anionic dyestuff or anionic optical brightening agent has a K-value at least one unit lower than the K'-value of the anionic dyestuff used in step (1). Depending on the final pattern which is desired, it may be possible to apply one or more of such pastes or liquors, either simultaneously or one after the other. For example, a paste containing the reserving agent alone and/or one or more liquors or pastes comprising the reserving agent and one or more disperse dyes and/or one or more anionic dyes of the specified type may be applied locally on the ground dyed substrate.

Suitable anionic dyestuffs for the local colouration are those having preferably a K-value 2 to 6 units lower than the K'-value of the anionic dye applied in step (1). Preferred anionic dyestuffs of this type are acid dyes, direct dyes and metal complex dyes, more preferably acid dyes. Such anionic dyes and the disperse dyes which may be used are known from the Colour Index. Particularly preferred dyestuffs are those commercially available under the registered Trade Mark Nylosan E and N (Sandoz, Basle, Switzerland). Anionic dyes are preferred for the local colouration.

When an optical brightener is applied, preferred brighteners are those having "dyeing" and combinability properties analogous to the anionic dyes used in step (2).

In addition to the reserving agent and optionally the dyestuff or brightener, the paste or liquor may contain conventional additives for example thickeners. The paste or liquor is adjusted to an alkaline pH depending on the type of the substrate, e.g. to pH 9 to 10. Such an adjustment of the pH may be effected by the addition of an alkaline compound, e.g. trisodium phosphate, disodium hydrogenphosphate, etc . . . It will be appreciated that the additives present in the liquor or paste must be resistant to the alkaline medium.

Subsequent to the local reserving and/or colouration, the substrate is submitted to a heat treatment to effect fixation of the dyestuff(s) and, if used, the brightening agent. Fixation can be achieved by known methods depending on the dyestuff or agent used, preferably with saturated steam at a temperature of 100° to 105° C. The heat treatment in step (3) is carried out for 2 to 20, preferably 5 to 10 minutes.

After fixation has been achieved, the substrate may be rinsed and dried in conventional manner.

The substrates dyeable with anionic dyes are preferably those consisting of or comprising natural polyamide, e.g. wool or silk, synthetic polyamide, e.g. nylon 6, 66, etc . . . and blends thereof, including differential synthetic polyamide. The substrate may for example be in form of yarn, fibres, filaments, woven or knitted goods, felt or carpets. The process of the invention is particularly suitable for dyeing polyamide carpets, preferably synthetic polyamide carpets.

The dyeing process of the invention is a continuous dyeing of a substrate according to a wet-on-wet method. Multicoloured and/or reserve patterns with sharp outlines and more particularly with a total reserve effect on a base dyeing can thereby be achieved. The dyeing process of the invention is also economical as there is no intermediary rinsing, washing and/or drying step between the impregnation (1) and the local reserving or colouration (2). Furthermore, good reserve effects are achieved with a relatively small amount of alkoxylated fatty amine or polyamine. This is particularly advantageous for the dyeing of substrates such as carpets, enabling thereby important savings in chemicals, energy and water. Another advantage of the process of the invention is the possibility of obtaining full reserve and pure bicoloured effects with dyestuffs for which only partial reservation could be achieved with the hitherto known reserving agents, particularly those containing a fibre-reactive group.

The following Examples further serve to illustrate the invention. In the Examples all parts are by weight and all temperatures are in degrees Centigrade unless otherwise stated.

EXAMPLE 1

A tufted carpet of polyamide 66 is impregnated with a padding liquor containing, per 1000 parts 6 parts dyestuff C.I. Acid Brown 298 (K'-value=6)

8 parts commercial thickening agent based on locust bean flour 1 part commercially available non-ionic dispersing agent based on aromatic polyglycol ether 1 part sodium acetate, and 984 parts water at a pick up of 200%. The pH of this padding liquor has been adjusted to 5 by addition of acetic acid. The impregnated carpet is subsequently treated with drops of a liquor containing, per 1000 parts 15 parts commercial thickening agent which is alkali resistant 6 parts ethoxylated tallow-aminopropylamine (containing 30 ethylene-oxy units)

2 parts trisodium phosphate, and 977 parts water.

The carpet is treated afterwards for 10 minutes in saturated steam at 100° and then rinsed. A brown dyed carpet with a white pattern is obtained.

EXAMPLE 2

A tufted polyamide carpet is padded with a liquor as described in Example 1 and then treated with drops of a liquor containing, per 1000 parts 3 parts dyestuff C.I. Acid Orange 156 (K-value=2.5)

15 parts commercial thickening agent which is alkali resistant 6 parts tallow-aminopropylamine ethoxylated with 30 mols ethylene oxide 2 parts trisodium phosphate, and 974 parts water.

The carpet is subsequently treated for 10 minutes in saturated steam at 100° and then rinsed.

A brilliant orange pattern on a brown background is obtained.

EXAMPLE 3

Knitted goods of polyamide 6 carpet yarn are impregnated at a pick-up of 100% with a padding liquor as described in Example 1 but replacing 6 parts of dyestuff C.I. Acid Brown 298 by 16 parts of dyestuff C.I. Acid Green 106. Subsequently, a printing paste containing, per 1000 parts 3 parts dyestuff Acid Blue 40 (K-value=2)

15 parts commercial thickening agent which is alkali resistant 6 parts tallow-aminopropylamine ethoxylated with 30 mols ethylene oxide 2 parts trisodium phosphate, and 974 parts water is printed on the impregnated substrate by a printing screen. Then the substrate is treated for 10 minutes in saturated steam at 100°.

A print of pure blue shade is obtained with notably sharp outlines.

EXAMPLE 4

By following the procedure of example 1, 2 or 3, but replacing the ethoxylated tallowaminopropylamine by the optionally quaternized addition product of 1 mol of (a) stearylamino-ethylamine or -propylamine (b) behenylamino-ethylamine or -propylamine (c) a commercially available amine mixture having the following composition:

palmityl-aminopropylamine about 30% stearylaminopropylamine about 30% oleylaminopropylamine about 40%

(d) N-oleylethylenediamine (e) stearamido-propylamine (f) tallowamido-propylamine with 1 to 100 mols ethylene oxide and/or 1 to 100 mols propylene oxide (with the proviso that the total sum of ethyleneoxy and/or propylene-oxy units present in the molecule is from 10 to 100), similar good results are obtained.

EXAMPLE 5

Knitted goods of polyamide 6 carpet yarn are impregnated with a padding liquor containing, per 1000 parts 12 parts dyestuff C.I. Acid Green 106 (K'-value=8.5)

4 parts commercial thickening agent based on locust bean flour 2 parts commercially available non-ionic dispersing agent, and 982 parts water at a pick-up of 120%.

The pH of this padding liquor has been adjusted to 6 by addition of acetic acid. The impregnated carpet is subsequently printed on selected areas with a paste containing, per 1000 parts 2.8 parts dyestuff C.I. Acid Yellow 151 (K-value=3)

2 parts dyestuff C.I. Acid Yellow 127 (K-value=3.5)

2.8 parts dyestuff C.I. Acid Orange 127 (K-value=3.5)

4 parts tallow-aminopropylamine-ethoxylated with 30 mols ethylene oxide 15 parts commercial thickening agent which is alkali resistant 1 part tri-sodium phosphate 4 parts di-sodium hydrogeno-phosphate, and 968.4 parts water.

The material is subsequently treated for 10 minutes in saturated steam at 100° and then rinsed.

Yellow and orange patterns are obtained on a green background.

EXAMPLE 6

Proceeding in a manner analogous to Example 5 but replacing for the ground dyeing the 12 parts of dyestuff C.I. Acid Green 106 by a mixture of 2.2 parts of dyestuff C.I. Acid Brown 298, 0.7 parts of dyestuff C.I. Acid Green 106 and 8.24 parts of dyestuff C.I. Acid Blue 80 (K'-value=9), and for the local printing the mixture of C.I. Acid Yellow 151, C.I. Acid Yellow 127 and C.I. Acid Orange 127 by a mixture of 2 parts of dyestuff C.I. Acid Orange 156 (K-value=2.5) and 0.4 parts of dyestuff C.I. Acid Blue 40 (K-value=2), similar good results are obtained.

What is claimed is:

1. A process for dyeing an anionic dyeable substrate with reserve effects, which process comprises
    (1) impregnating the substrate with a dyeing liquor containing an anionic dye having a K'-value $\geq 5$
    (2) directly thereafter applying locally to the substrate a liquor or paste containing an alkoxylated fatty amine or polyamine having affinity for anionic dyes with a K'-value $\geq 5$ and
    (3) subsequently submitting the substrate to a heat treatment to effect fixation of the dye.

2. A process according to claim 1, in which in step (1) the substrate is ground dyed on the whole surface with an acid dye having a K'-value $\geq 5$, such dye bearing at least two sulpho groups or being a metal complex dye containing at least one sulpho group.

3. A process according to claim 1, in which the pH of the dyeing liquor used in step (1) is 4 to 7.

4. A process according to claim 1, in which the liquor or paste applied in step (2) contains an alkoxylated fatty amine or polyamine of formula I

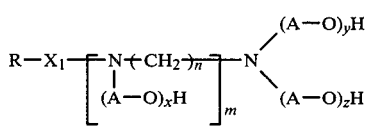

wherein the form of the
R is $(C_{10-24})$alkyl, $(C_{10-24})$alkenyl
$X_1$ is —CO— or a direct bond in each $(A-O)_x$, $(A-O)_y$ and $(A-O)_z$ chain A is, independently, —CH$_2$CH$_2$— or

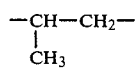

each n is, independently, 2 or 3 m is 0 or an integer from 1 to 6, and
each x, y or z is a numeral from 1 to 100, the sum x+y+z being from 10 to 100, in free base or acid addition and/or quaternary ammonium salt form.

5. A process according to claim 1, in which the liquor or paste applied in step (2) contains an alkoxylated fatty amine or polyamine of formula Ia

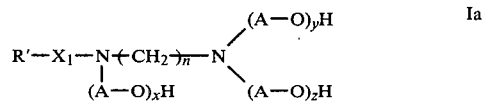

wherein A, $X_1$, x, y, z and n are as stated above and R' is $(C_{12-24})$alkyl or $(C_{12-24})$alkenyl.

6. A process according to claim 1, in which the liquor or paste applied in step (2) contains 1 to 15 g/liter of alkoxylated fatty amine or polyamine.

7. A process according to claim 1, in which the liquor or paste applied in step (2) is alkaline.

8. A process according to claim 1, in which the substrate dyeable with anionic dyes comprises natural or synthetic polyamide or blends thereof.

9. A process according to claim 1 wherein the liquor or paste applied in step (2) contains, in addition to the alkoxylated fatty amine or polyamine, a disperse dye, an anionic dye or a mixture thereof or an anionic optical brightening agent, said anionic dye or anionic optical brightening agent having a K-value which is at least one unit lower than the K'-value of the anionic dye used in step (1) and said dye(s) or optical brightening agent applied in step (2) are also fixed by the heat treatment of step (3).

10. A process according to claim 9, in which the liquor or paste applied in step (2) contains, in addition to the alkoxylated fatty amine or polyamine, a disperse dye, an anionic dye having a K-value at least one unit lower than the K'-value of the anionic dyestuff used in step (1) or a mixture thereof.

11. A process according to claim 10, in which the liquor or paste applied in step (2) contains, in addition to the alkoxylated fatty amine or polyamine, an acid dye having a K-value 2 to 6 units lower than the K'-value of the anionic dye applied in step (1).

12. A process according to claim 1 wherein step (1) is a ground dyeing of the whole area of the substrate.

13. A process according to claim 1 wherein the anionic dye applied in step (1) has a K'=value $\geq 6$.

14. A process according to claim 2 wherein the dye is a 1:2 or 1:1 chromium or cobalt complex of an azo or azomethine dye.

15. A process according to claim 1 wherein the amine used in step (2) is free from fiber-reactive groups.

16. A process according to claim 4 wherein, in the compound of formula I, the sum of x+y+z is 15 to 80.

17. A process according to claim 9 wherein the liquor or paste applied in step (2) has a pH of 9–10.

18. A process according to claim 1 wherein step (1) is carried out at room temperature.

* * * * *